US012558761B2

(12) United States Patent
Alkhaldi

(10) Patent No.: US 12,558,761 B2
(45) Date of Patent: Feb. 24, 2026

(54) FASTENER INSERT TOOLS AND METHODS OF INSERTING FASTENERS USING FASTENER INSERT TOOLS

(71) Applicant: Toyota Motor Engineering & Manufacturing North America, Inc., Plano, TX (US)

(72) Inventor: Mohammed Ali Alkhaldi, Sadieville, KY (US)

(73) Assignees: Toyota Motor Engineering & Manufacturing N.A, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 303 days.

(21) Appl. No.: 18/111,184

(22) Filed: Feb. 17, 2023

(65) Prior Publication Data

US 2024/0278396 A1 Aug. 22, 2024

(51) Int. Cl.
*B25B 23/10* (2006.01)
*B25B 23/16* (2006.01)

(52) U.S. Cl.
CPC .............. *B25B 23/10* (2013.01); *B25B 23/16* (2013.01)

(58) Field of Classification Search
None
See application file for complete search history.

(56) References Cited

U.S. PATENT DOCUMENTS

| | | | | | |
|---|---|---|---|---|---|
| 512,381 | A * | 1/1894 | Keyes | B03C 1/284 | 335/285 |
| 2,087,034 | A * | 7/1937 | Jameson | E21B 31/06 | 294/65.5 |
| 2,341,063 | A * | 2/1944 | Tinnerman | B25B 29/02 | 29/278 |
| 2,733,949 | A * | 2/1956 | Russell | H01F 7/0257 | 294/65.5 |
| 2,970,002 | A * | 1/1961 | Laviano | B03C 1/284 | 294/65.5 |
| 2,976,075 | A * | 3/1961 | Budreck | B03C 1/284 | 294/65.5 |
| 3,771,084 | A * | 11/1973 | Thon | G03G 15/0822 | 294/65.5 |
| 4,813,729 | A * | 3/1989 | Speckhart | B03C 1/284 | 335/302 |
| 4,943,098 | A * | 7/1990 | Aoyama | B65G 47/92 | 414/737 |
| 5,060,359 | A * | 10/1991 | Muir | B21J 15/022 | 29/244 |

(Continued)

FOREIGN PATENT DOCUMENTS

| | | |
|---|---|---|
| CN | 202129753 U | 2/2012 |
| CN | 104647262 B | 6/2016 |

(Continued)

*Primary Examiner* — Monica S Carter
*Assistant Examiner* — Jonathan R Zaworski
(74) *Attorney, Agent, or Firm* — Dinsmore & Shohl LLP

(57) ABSTRACT

A fastener insert tool includes an inner trigger part that includes inner legs and an outside case part that includes outer legs that are configured to slidably receive the inner legs of the inner trigger part. The inner legs of the inner trigger part are configured to slide relative to the outer legs of the outside case part to release fasteners from magnets carried by the inner legs of the trigger part.

18 Claims, 3 Drawing Sheets

(56) References Cited

U.S. PATENT DOCUMENTS

| | | | | | |
|---|---|---|---|---|---|
| 5,067,763 | A * | 11/1991 | Aoyama | B65G 47/92 414/737 |
| 5,074,742 | A * | 12/1991 | Aoyama | B23Q 7/04 414/800 |
| 5,169,193 | A * | 12/1992 | Stelmach | H01F 7/0257 294/65.5 |
| 5,265,887 | A * | 11/1993 | Stelmach | E01H 1/14 294/65.5 |
| 5,471,186 | A * | 11/1995 | Seo | H05K 13/0447 294/65.5 |
| 5,799,999 | A * | 9/1998 | Schneider | B25J 1/04 294/65.5 |
| 6,056,339 | A * | 5/2000 | Berger | B25B 11/002 294/65.5 |
| 6,148,482 | A * | 11/2000 | Maraman, Jr. | B25G 1/105 81/177.1 |
| 7,055,408 | B2 * | 6/2006 | Sasaki | B23P 19/06 81/433 |
| 7,618,435 | B2 * | 11/2009 | Opolski | A61B 17/12022 606/1 |
| 9,308,608 | B2 * | 4/2016 | Townsend | E21B 33/068 |
| 9,376,266 | B2 * | 6/2016 | Kira | B23P 19/069 |
| 9,764,452 | B2 * | 9/2017 | Koch | B25B 23/12 |
| 10,322,479 | B2 * | 6/2019 | Kira | B25B 23/12 |
| 10,573,446 | B2 * | 2/2020 | Smith | B25B 11/00 |
| 11,752,606 | B1 * | 9/2023 | Young | B25B 27/10 29/278 |
| 11,926,488 | B2 * | 3/2024 | Park | B23Q 5/28 |
| 2013/0057003 | A1 * | 3/2013 | Watson | H01F 7/0257 294/65.5 |
| 2014/0345427 | A1 | 11/2014 | Gessani et al. | |

FOREIGN PATENT DOCUMENTS

| | | | |
|---|---|---|---|
| CN | 109676559 | B | 8/2020 |
| CN | 213827851 | U | 7/2021 |
| CN | 214352075 | U | 10/2021 |

* cited by examiner

FASTENER INSERT TOOLS AND METHODS OF INSERTING FASTENERS USING FASTENER INSERT TOOLS

TECHNICAL FIELD

The present specification generally relates to fastener insert tools, and more specifically, fastener insert tools that are used to place multiple fasteners in fastener openings.

BACKGROUND

Fasteners are commonly used to assemble various parts, such as an engine of a vehicle. Various tools, such as drivers that connect to sockets are known that can be used to turn the fasteners into mating fastener openings. The sockets can also be used to hold and retain the fasteners for ease of placement of the fasteners within the fastener openings one fastener at a time.

What is needed are fastener insert tools that can place multiple fasteners within fastener openings.

SUMMARY

In one embodiment, a fastener insert tool includes an inner trigger part that includes inner legs and an outside case part that includes outer legs that are configured to slidably receive the inner legs of the inner trigger part. The inner legs of the inner trigger part are configured to slide relative to the outer legs of the outside case part to release fasteners from magnets carried by the inner legs of the trigger part.

In another embodiment, a method of placing fasteners within respective fastener openings is provided. The method includes engaging fasteners using magnets of a fastener insert tool. The fastener insert tool includes an inner trigger part that includes inner legs and an outside case part that includes outer legs that are configured to slidably receive the inner legs of the inner trigger part. The inner legs of the inner trigger part are configured to slide relative to the outer legs of the outside case part to release bolts from the magnets carried by the inner legs of the trigger part. The fasteners are placed in the respective fastener openings with the fasteners engaged with the magnets.

In another embodiment, a fastener insert tool system includes a fastener insert tool that includes an inner trigger part that includes inner legs and an outside case part that includes outer legs that are configured to slidably receive the inner legs of the inner trigger part. The inner legs of the inner trigger part are configured to slide relative to the outer legs of the outside case part to release fasteners engaged with the inner legs of the trigger part. A holster includes a holster body with openings extending therethrough that are sized to the outer legs of the fastener insert tool.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

The present description is generally directed to a fastener insert tool that includes an inner trigger part and an outside case part. The inner trigger part includes inner legs that are received by outer legs of the outside case part. A cap that connects to the outside case part to hold the trigger part within the outside case part. The inner legs of the trigger part can be slid relative to the outer legs of the outside case part to release bolts from magnets carried by the inner legs of the trigger part.

Figure 1:
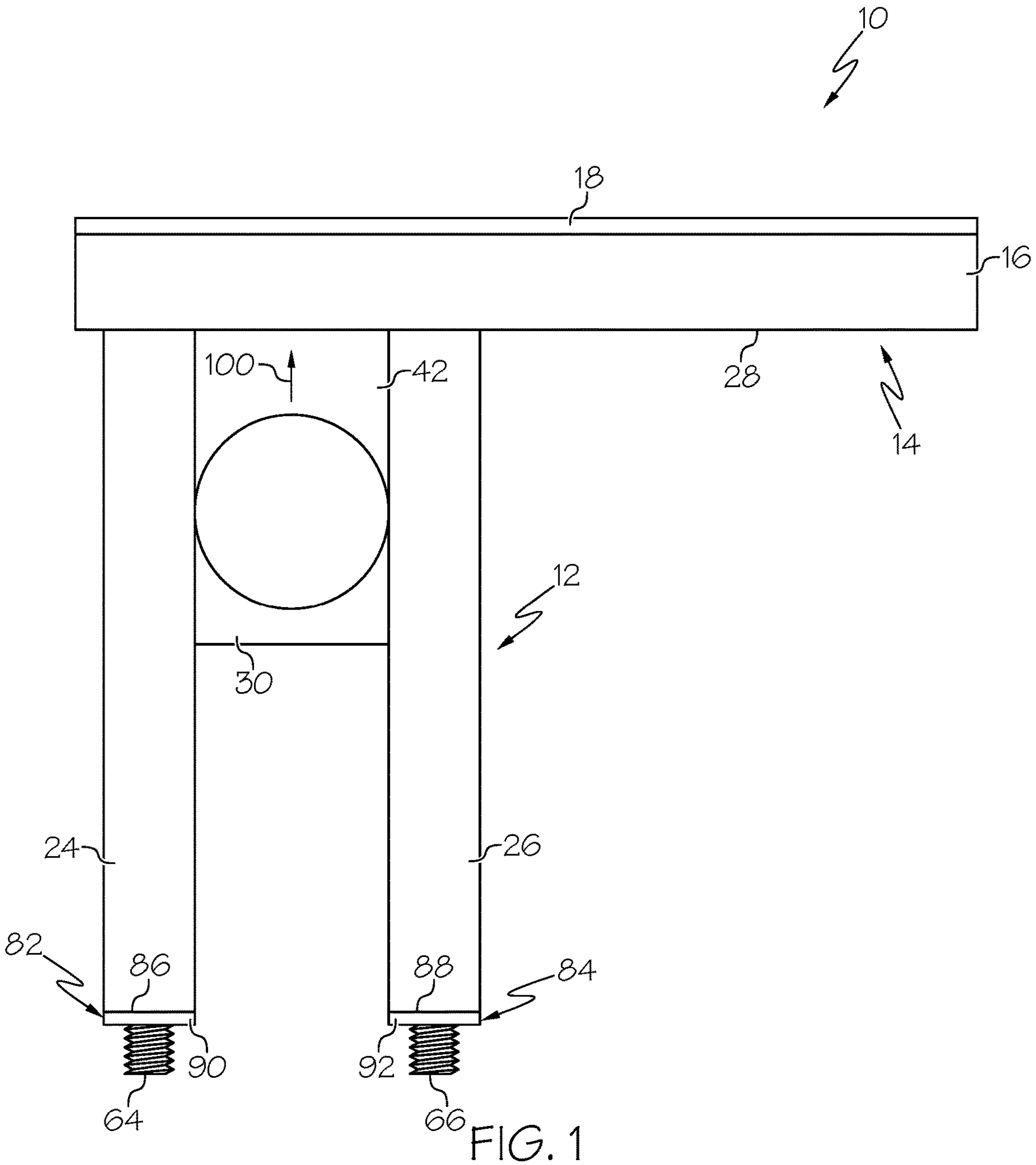
FIG. 1 is a front view of a fastener insert tool, according to one or more embodiments shown and described herein.
Figure 2:
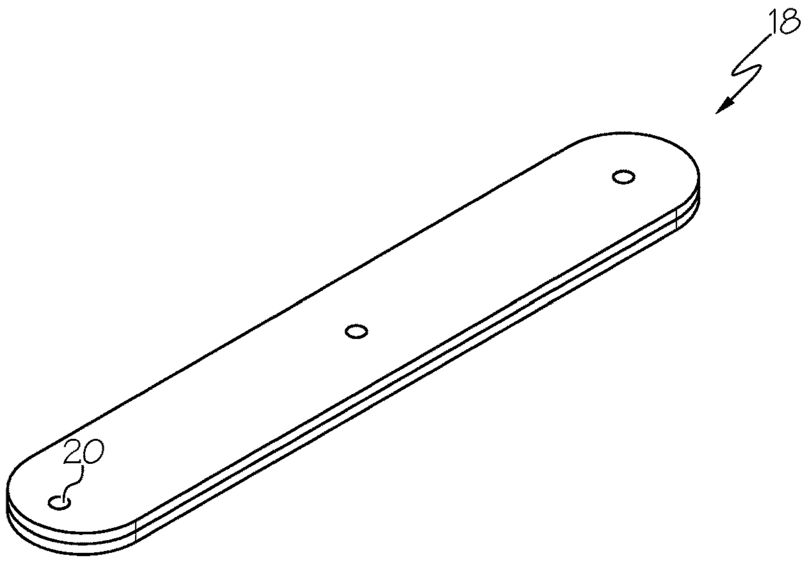
FIG. 2 is a perspective view of a cap of the fastener insert tool of FIG. 1, according to one or more embodiments shown and described herein.

Referring to FIG. 1, a fastener insert tool 10 includes an outside case part 12 that includes a handle 14 including a handle body 16 that is sized to be grasped by a user with a cap 18 that is connected to the handle body 16. For example, referring briefly to FIG. 2 showing the cap 18 in isolation, the cap 18 may include fastener-receiving openings 20 that are sized to receive fasteners to connect the cap 18 to the handle body 16 using corresponding fastener-receiving openings 22 (FIG. 3).

Figure 3:
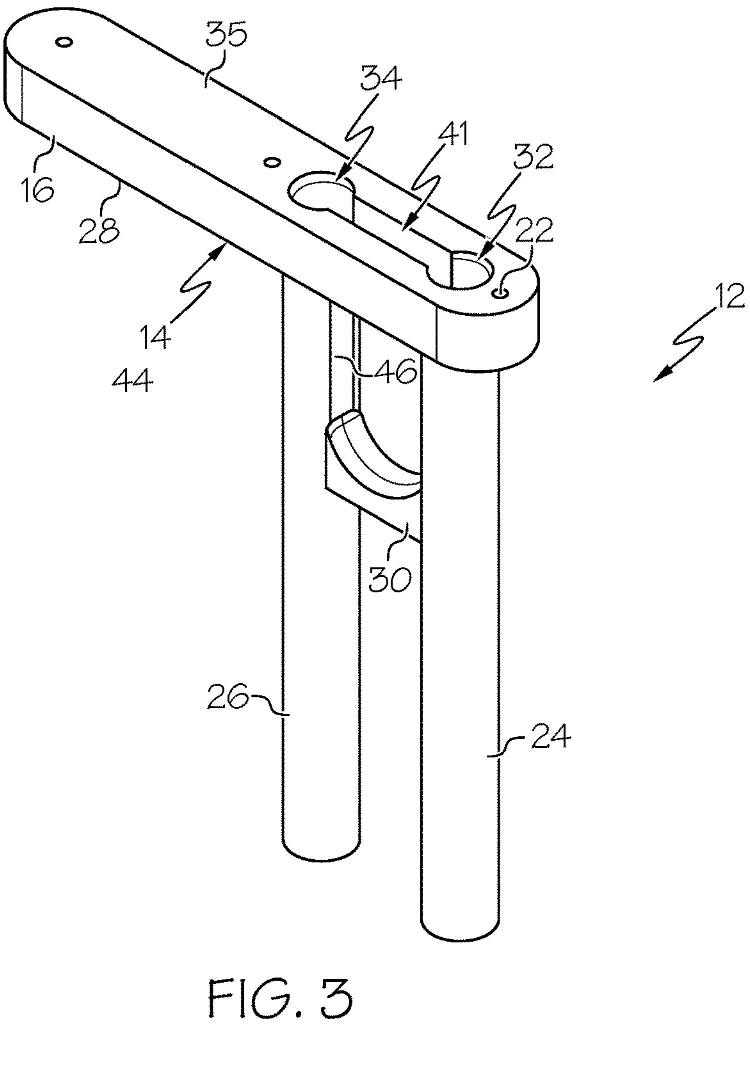
FIG. 3 is a perspective view of an outside case part of the fastener insert tool of FIG. 1, according to one or more embodiments shown and described herein.
Figure 4:
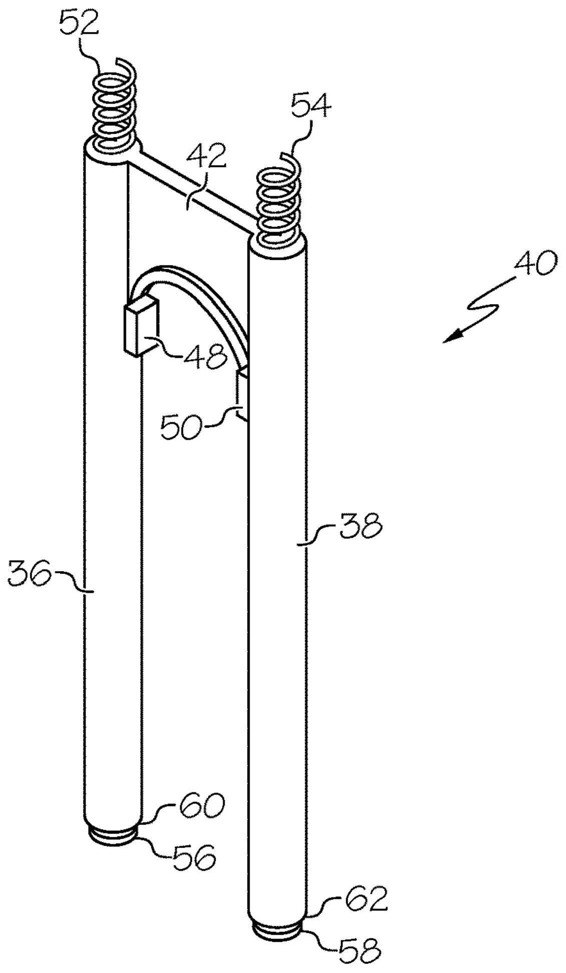
FIG. 4 is a perspective view of an inner trigger part of the fastener insert tool of FIG. 1, according to one or more embodiments shown and described herein.

Referring to FIGS. 1 and 3, outer legs 24 and 26 extend outward from a lower surface 28 of the handle body 16. A trigger guard 30 extends between the outer legs 24 and 26. The outer legs 24 and 26 each include a leg-receiving opening 32 and 34 that extend through the outer legs 24 and 26, through the handle body 16 and intersect an outer surface 35 of the handle body 16. The leg-receiving openings 32 and 34 are sized to slidably receive inner legs 36 and 38 of an inner trigger part 44 (FIG. 4). A trigger slot 41 through the handle body 16 extends between the leg-receiving openings 32 and 34 at the outer surface 35 that is sized to slidably receive a trigger 42 of an inner trigger part 44 (FIG. 4). The outer legs 24 and 26 each include a groove 46 extending along lengths of the outer legs 24 and 26. The grooves 46 are in communication with the trigger slot 41 and slidably receive the trigger 42 of the inner trigger part 44 and allow the trigger 42 to slide toward and away from the handle body 16 relative to the outside case part 12 to actuate the inner trigger part 44.

Referring to FIG. 4, the inner trigger part 44 includes inner legs 36 and 38 that are slidably received within the leg-receiving openings 32 and 34 of the outer legs 24 and 26. The inner trigger part 44 includes the trigger 42 that extends between the inner legs 36 and 38 and is slidably received within the trigger slot 41. Located adjacent the trigger 42 on the inner legs 36 and 38 are guide members 48 and 50 that can slide along the grooves 46 of the outer legs 24 and 26 and help maintain alignment of the inner trigger part 44 relative to the outside case part 12 as the inner trigger part 44 is actuated. Biasing members 52 and 54 (e.g., springs) can be provided that can be received within the leg-receiving openings 32 and 34. The biasing members 52 and 54 can bias the inner trigger part 44 toward an extended, unactuated position, as shown by FIG. 1. Magnets 56 and 58 may be provided at ends 60 and 62 of the inner legs 36 and 38. The magnets 56 and 58 may be used to attract and hold fasteners 64 and 66 within the outer legs 24 and 26 until the inner trigger part 44 is actuated.

Figure 5:
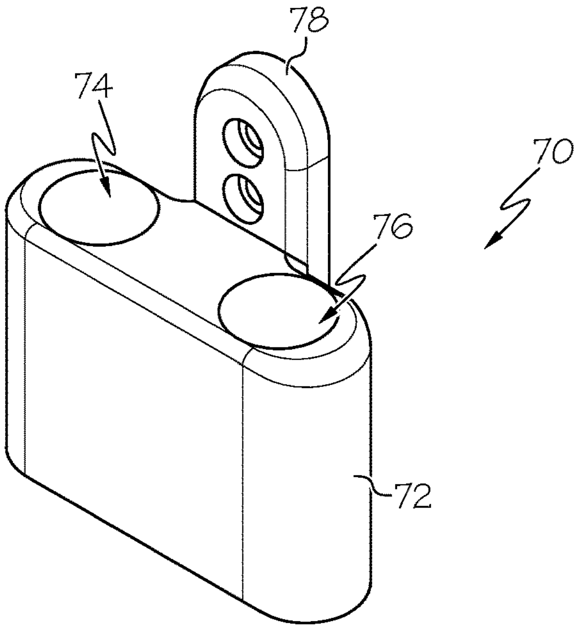
FIG. 5 is a perspective view of a holster for use with the fastener insert tool of FIG. 1, according to one or more embodiments shown and described herein.

Referring to FIG. 5, a holster 70 may be provided to provide a fastener insert tool system that can receive and hold the fastener insert tool 10. In particular, the holster can include a holster body 72 that includes openings 74 and 76 that are sized and arranged to receive the outer legs 24 and 26. A mounting flange 78 may be provided that has fastener openings 80 that can be used to mount the holster 70 on a support surface.

FIG. 1 also shows operation of the fastener insert tool 10. To operate the fastener insert tool 10, heads 82 and 84 of the fasteners 64 and 66 may be placed inside ends 86 and 88 of the outer legs 24 and 26 and magnetically engaged with the magnets 56 and 58. The heads 82 and 84 may include flanges 90 and 92 that are sized larger than the leg-receiving openings 32 and 34 at the ends 86 and 88 such that the flanges 90 and 92 rest against the ends 86 and 88 and the fasteners 64 and 66 are inhibited from travelling farther into the outer legs 24. The fastener insert tool 10 with the fasteners 64 and 66 may then be moved into a desired location where the fasteners 64 and 66 can be placed simultaneously within fastener openings. The trigger 42 can then be manually squeezed, represented by arrow 100, which causes the inner trigger part 40 to retract away from the fasteners 64 and 66. Because the fasteners 64 and 66 have the flanges 90 and 92, the fasteners 64 and 66 cannot travel with the inner trigger part 40 and become disengaged from the magnetic attraction of the magnets 56 and 58 and released from the fastener insert tool 10 to remain in their corresponding fastener openings. The fastener insert tool 10 can then be placed in the holster 70 (FIG. 5).

The above-described fastener insert tools can allow for simultaneous placement of multiple fasteners into fastener openings at location that are difficult to reach by hand. Such simultaneous placement can reduce cycle time for part assembly, such as an oil pan of a vehicle engine. Magnets can be used to help retain and facilitate placement of the fasteners without inadvertently dropping the fasteners from the fastener insert tools. While two legs are shown and described, there may be more than two legs depending on how many fasteners are needed. The outside casing part and the inner trigger part may be formed using any suitable process such as molding, 3D printing and/or machining.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A fastener insert tool comprising:

an inner trigger part that includes a first inner leg, a second inner leg and a trigger that extends between the first inner leg and the second inner leg; and an outside case part that includes a handle comprising a handle body that includes a first outer leg that is configured to slidably receive the first inner leg of the inner trigger part, a second outer leg that is configured to slidably receive the second inner leg of the inner trigger part and a trigger slot that extends between the first and second outer legs, the first and second outer legs each comprising a groove that slidably receives the trigger such that actuating the trigger retracts the trigger within the trigger slot and moves both the first and second inner legs relative to both of the first and second outer legs;

wherein the first and second inner legs of the inner trigger part are configured to slide relative to the first and second outer legs of the outside case part to release fasteners from magnets carried by the first and second inner legs of the trigger part.

2. The fastener insert tool of claim 1, further comprising a cap that connects to the outside case part to hold the inner trigger part within the outside case part.

3. The fastener insert tool of claim 1, wherein the first outer leg extends outward from the handle body and has a first leg-receiving opening extending therethrough and the second outer leg extends outward from the handle body and has a second leg-receiving opening extending therethrough.

4. The fastener insert tool of claim 3, wherein the first inner leg is sized to be slidably received by the first leg-receiving opening and the second inner leg is sized to be slidably received by the second leg-receiving opening.

5. The fastener insert tool of claim 1, wherein the grooves of the first outer leg and second outer leg are in communication with the trigger slot.

6. The fastener insert tool of claim 1, wherein the first and second outer legs each has a groove that is in communication with the trigger slot such that the trigger slides into and out of the handle body when actuated.

7. The fastener insert tool of claim 6, further comprising a cap that is connected to an outer surface of the handle body, wherein a spring is located in the first leg-receiving opening and between the first inner leg and the cap.

8. A method of placing fasteners within respective fastener openings, the method comprising:

engaging fasteners using magnets of a fastener insert tool, the fastener insert tool comprising:

an inner trigger part that includes a first inner leg, a second inner leg and a trigger that extends between the first inner leg and the second inner leg; and an outside case part that includes a handle comprising a handle body having a trigger slot, a first outer leg that is configured to slidably receive the first inner leg of the inner trigger part, a second outer leg that is configured to slidably receive the second inner leg of the inner trigger part and a trigger slot that extends between the first and second outer legs, the first and second outer legs each comprising a groove that slidably receives the trigger such that actuating the trigger retracts the trigger within the trigger slot and moves both the first and second inner legs relative to both of the first and second outer legs;

wherein the first and second inner legs of the inner trigger part are configured to slide relative to the first and second outer legs of the outside case part to release bolts from the magnets carried by the first and second inner legs of the trigger part; and placing the fasteners in the respective fastener openings with the fasteners engaged with the magnets.

9. The method of claim 8, further comprising moving the inner trigger part relative to the outside case part using the trigger thereby releasing the fasteners from the magnets.

10. The method of claim 8, further comprising placing the fastener insert tool in a holster.

11. A fastener insert tool system comprising:

a fastener insert tool comprising:

an inner trigger part that includes inner legs; and an outside case part that includes a handle comprising a handle body having a trigger slot, a first outer leg that is configured to slidably receive the first inner leg of the inner trigger part, a second outer leg that is configured to slidably receive the second inner leg of the inner trigger part and a trigger slot that extends between the first and second outer legs, the first and second outer legs each comprising a groove that slidably receives the trigger such that actuating the trigger retracts the trigger within the trigger slot and moves both the first and second inner legs relative to both of the first and second outer legs;

wherein the first and second inner legs of the inner trigger part are configured to slide relative to the first and second outer legs of the outside case part to release fasteners engaged with the first and second inner legs of the trigger part; and a holster comprising a holster body with openings extending therethrough that are sized to the first and second outer legs of the fastener insert tool.

12. The fastener insert tool system of claim 11, wherein the fastener insert tool further comprises a cap that connects to the outside case part to hold the inner trigger part within the outside case part.

13. The fastener insert tool system of claim 11, wherein the outer legs comprise the first outer leg extending outward from the handle body and having a first leg-receiving opening extending therethrough and the second outer leg extending outward from the handle body and having a second leg-receiving opening extending therethrough.

14. The fastener insert tool system of claim 13, wherein the first inner leg is sized to be slidably received by the first leg-receiving opening and the second inner leg is sized to be slidably received by the second leg-receiving opening.

15. The fastener insert tool system of claim 11, wherein the grooves of the first outer leg and the second outer leg are in communication with the trigger slot.

16. The fastener insert tool system of claim 15, wherein the first and second outer legs each has a groove that is in communication with the trigger slot such that the trigger slides into and out of the handle body when actuated.

17. The fastener insert tool system of claim 16, further comprising a cap that is connected to an outer surface of the handle body, wherein a spring is located in the first leg-receiving opening and between the first inner leg and the cap.

18. The fastener insert tool system of claim 11, wherein the holster further comprises a mounting tab connected to the holster body.

* * * * *